United States Patent [19]

Khasat

[11] Patent Number: 5,171,776
[45] Date of Patent: Dec. 15, 1992

[54] USE OF CHLORINATED POLYMERS TO INCREASE THE HDT AND $T_g$ OF DICYCLOPENTADIENE POLYMERS

[75] Inventor: Nitya P. Khasat, Newark, Del.

[73] Assignee: Hercules Incorporated, Wilmington, Del.

[21] Appl. No.: 717,765

[22] Filed: Jun. 19, 1991

[51] Int. Cl.[5] .................. C08L 45/00; C08L 24/04; C08F 277/00; C08F 36/00
[52] U.S. Cl. .................. 529/518; 524/519; 525/211; 525/213; 525/214; 525/215; 525/290; 526/201; 526/283
[58] Field of Search .............. 526/283, 201; 525/211, 525/290, 213, 214, 215; 524/518, 519

[56] References Cited

U.S. PATENT DOCUMENTS

| | | | |
|---|---|---|---|
| 4,039,491 | 8/1977 | Ikeda et al. | 260/4 R |
| 4,400,340 | 8/1983 | Klosiewicz | 264/328.6 |
| 4,699,963 | 10/1987 | Klosiewicz | 526/142 |
| 4,703,098 | 10/1987 | Matlack | 526/283 |

FOREIGN PATENT DOCUMENTS

| | | | |
|---|---|---|---|
| 50-123751 | 9/1975 | Japan | 525/211 |
| 53-09900 | 1/1978 | Japan . | |
| 53-115763 | 10/1978 | Japan | 525/211 |
| 57-003863 | 1/1982 | Japan | 525/211 |

*Primary Examiner*—Paul R. Michl
*Assistant Examiner*—Peter Szekely
*Attorney, Agent, or Firm*—Roy V. Jackson

[57] ABSTRACT

A crosslinked polymer composition obtained by the metathesis polymerization of a dicyclopentadiene monomer in which a chlorinated polymer such as a chlorinated elastomer or chlorinated polypropylene is dissolved; a crosslinked dicyclopentadiene polymer composition comprising a ring-opened dicyclopentadiene polymer and a dicyclopentadiene-soluble chlorinated polymer; and a method for preparing a crosslinked polymer composition comprising adding the chlorinated polymer to one of two reactant liquid streams, one of which contains dicyclopentadiene and a ring-opening metathesis catalyst and the other contains a catalyst activator, combining the two streams, and charging them to a mold or similar forming container in which the dicyclopentadiene polymerizes.

15 Claims, No Drawings

USE OF CHLORINATED POLYMERS TO INCREASE THE HDT AND $T_g$ OF DICYCLOPENTADIENE POLYMERS

This invention relates to polymers of norbornene type monomers or mixtures of such monomers, more specifically polymers of dicyclopentadiene that optionally contain one or more other norbornene-type comonomers, and a process for making them.

BACKGROUND OF THE INVENTION

Crosslinked (thermoset) polymers of strained ring polycyclic cycloolefins are extensively used for making molded structural articles. The preparation of these polymers, usually based on dicyclopentadiene, is known, for example, from U.S. Pat. No. 4,400,340, which describes a reaction injection molding (RIM) technique in which a reactant stream containing a monomer to be polymerized and a metathesis catalyst, and a second stream containing a catalyst activator and additional monomer are brought together in a mixing head and substantially immediately injected into a mold where the monomer polymerizes within seconds to form a shaped article matching the shape of the mold. The polymerization involves the opening of a cycloolefin ring, and the monomers are described as being metathesis polymerizable. The reaction is catalyzed by a transition metal catalyst such as a tungsten or molybdenum salt, preferably tungsten halide or tungsten oxyhalide, activated by an alkyl aluminum compound. Details of the catalyst preparation are well known, for instance from U.S. Pat. No. 4,568,660. The gelation stage of the polymerization, unless the reaction is modified to delay it, takes place almost instantaneously. Such polymers can also be molded from a single stream, using a modifier to delay the gelation stage of the pre mixed ingredients.

Poly(dicyclopentadiene) and the other cycloolefin polymer products, which are extensively crosslinked, combine relatively high values of impact strength and flexural modulus, compared to other polymers, and they are insoluble in common solvents such as gasoline, naphtha, chlorinated hydrocarbons, and aromatics. However, they have a relatively low heat deflection temperature (HDT), about 85° C., and a relatively low glass transition temperature ($T_g$), which is on the order of 125°-130° C. for poly(dicyclopentadiene). For many applications there is a need for higher values of HDT and $T_g$ as well as typically good impact strength, as pointed out in U.S. Pat. No. 4,703,098. That patent discloses crosslinked copolymers of dicyclopentadiene with higher cyclopentadiene oligomers prepared by a special heat treatment of the dicyclopentadiene followed by removal of low-boiling hydrocarbon by-products. The resulting increase in $T_g$ may cause a loss of impact strength, and the patent notes that the decrease may be substantially regained by adding 3 to 15% by weight of a hydrocarbon elastomer.

Such addition of soluble hydrocarbon based elastomers to one or both of the reactant streams is conventional in liquid molding processes, particularly in the RIM process, to increase the viscosity of the reactant streams and thereby avoid the turbulence caused in a low viscosity liquid by the high velocity mixing required by the RIM technique. Excessive turbulence can produce bubbles in the molded object. Also, such low viscosity liquids can leak out of a mold unless special provision for leak prevention is made. For instance, U.S. Pat. No. 4,699,963 discloses 5 to 10% of a soluble elastomer in one or both of the reactant streams, which increases the viscosity without making adequate mixing difficult, while also increasing the impact strength of the polymer product (to about 10 to 13 ft-lbs/in by the notched Izod strength test, equivalent to about 5.3 to 6.9 J/cm).

Of course, the reactant streams cannot be so viscous that adequate mixing is not possible. The patent indicates that increasing the viscosity to between 0,3 Pas and 1 Pas (the viscosity of DCPD is about 0.006 Pas (6 cps) at 35° C.) alters the mold filling characteristics of the combined reactant streams. Although the elastomer can be dissolved in either one or both of the reactant streams it is desirable that it be dissolved in both. When the two reactant streams have similar viscosities more uniform mixing is obtained.

In the disclosures of U.S. Pat. Nos. 4,703,098 and 4,699,963, the viscosifying elastomers are hydrocarbon rubbers, such as, for example, styrene-butadiene rubber (SBR), natural rubber, polyisoprene, ethylene-propylene copolymers, and styrene-butadiene styrene rubbers. However, they may not enhance either the heat deflection temperature (HDT) or the glass transition temperature ($T_g$) of the thermoset polymeric product.

U.S. Pat. No. 4,039,091 discloses a flame-retardant, metathesis-polymerized thermoplastic copolymer of a norbornene derivative having a polar group with an unsaturated polymer having carbon-to-carbon double bonds in which either the ring-opened polymer of the norbornene derivative or the unsaturated polymer (such as polyisoprene) or both are halogenated to obtain the flame retardancy, without suffering the decrease in impact strength and heat distortion temperature that would be found in known ring-opened halogen substituted norbornene derivatives. However, the product disclosed is not only thermoplastic, but also fails to exhibit either increased HDT or $T_g$ or decreased levels of odor or residual monomer.

For many applications there is an unfilled need for thermoset polymers of norbornene-type monomers, such as poly(dicyclopentadiene), that have more desirable values for those properties than any known comparable thermoset polymeric materials.

BRIEF DESCRIPTION OF THE INVENTION

In accordance with this invention, if a hydrocarbon elastomer as described in U.S. Pat. No. 4,699,963 is wholly or partly replaced with a dicyclopentadiene-soluble chlorinated polymer there is a significant improvement in the heat distortion temperature, for example, by about 25°, and the glass transition temperature of the polymer and associated properties as well as a noticeable reduction in the odor of the polymer, and there may also be a reduction in the level of residual, unreacted monomer after polymerization is completed, for example, to about 0.5% from about 2.5%.

If the chlorinated polymer is an elastomer, the beneficial increases in reactant stream viscosity and polymer impact strength attribtable to conventionally added hydrocarbon elastomers are also inherently realized. If a non-elastomeric polymer, such as chlorinated polypropylene is used, and if elastomers are not also present, the heat distortion temperature and $T_g$ are increased, without necessarily maintaining either the reactant stream viscosity—depending on the molecular weight of the polymer—or the polymer impact strength, attributable to the elastomers.

Therefore, in accordance with the invention, a polymer composition comprises a cross-linked ring opened polymer of a dicyclopentadiene (DCPD) monomer, which may be dicyclopentadiene (DCPD) or of a mixture of (DCPD) and another norbornene group-containing cycloolefin, and a dicyclopentadiene-soluble chlorinated polymer.

The invention also contemplates a method for preparing such polymer compositions comprising adding the dicyclopentadiene-soluble chlorinated polymer to at least one of the two reactant liquid streams conventionally used in the RIM process (one of which contains dicyclopentadiene and a ring-opening metathesis catalyst and the other contains a catalyst activator), combining the two streams, and charging them to a mold or similar forming container in which the dicyclopentadiene polymerizes.

DETAILED DESCRIPTION OF THE INVENTION

The dicyclopentadiene-soluble chlorinated polymers that can replace the hydrocarbon rubbers conventionally used, to make the polymer compositions in accordance with this invention include polychloroprene rubber and other chlorinated polymers. The preferred chlorinated polymer is polychloroprene rubber, such as that available under the tradename Neoprene W from E.I. duPont de Nemours & Company, and the preferred chlorinated non-elastomeric polymer is chlorinated polypropylene.

The amount of the dicyclopentadiene-soluble chlorinated polymer, based on the total weight of the composition, is about 3 to 20% by weight, preferably 10 to 15%, if the polymer is non-elastomeric, and about 3 to 10% by weight, preferably 5 to 8%, if the polymer is elastomeric, with the amount depending on how effective the polymer is as a viscosity enhancer.

The reduction in the odor of the polymer, and in the level of residual unreacted monomer, as well as a beneficial increase in impact strength of the polymer can be enhanced by adding to the polymerization mixture one or more chlorinated additives, such as chlorodiphenylmethane, dichlorodiphenylmethane, or 2 chloro-2-butene, which apparently can act as co-catalysts by reacting with aluminum alkyls to form cations.

Cycloolefins containing at least one norbornene group that can be combined with dicyclopentadiene (DCPD) to form a metathesis polymerizable mixture with DCPD can amount to about 50 weight percent of the mixture, and are those cycloolefins that are conventionally combined with dicyclopentadiene to form thermoset copolymers, including norbornene, norbornadiene, phenyl norbornene, tetracyclododecene, tetracyclododecadiene, ethylidene norbornene, ethylidene tetracyclododecene, and tricyclopentadiene, as well as other higher cyclopentadiene oligomers.

Other comonomers that can be used are norbornene derivatives containing polar groups such as cyanonorbornene, norbornene carboxylic acid esters, and pyridyl norbornene. Preferred comonomers are the higher cyclopentadiene oligomers, tetracyclododecene and tetracyclododecediene. Ethylidene norbornene may also be used as a comonomer with DCPD to take advantage of its freezing-point depressant activity with DCPD. The comonomers are preferably used in concentrations up to about 20% by weight, based on the total weight of DCPD plus the comonomer.

Since half or more of the monomer is DCPD, the resultant polymer will polymerize and crosslink simultaneously, so preferably the metathesis polymerization is carried out in bulk by the reaction injection molding technique already referred to, or by resin transfer molding (with longer mold-filling times), so that the reactive liquid polymerizes directly to the desired final shape. Preferably, the polymerization and molding are carried out by the RIM process. Each of the two reactive parts of the metathesis-catalyst system is mixed with monomer to form a stable solution, which is placed in a separate vessel to provide the source for the respective reactive stream. The two streams are combined in the RIM machine's mixing head and then injected into the mold where they quickly polymerize into a shaped structure. The mixing heads normally have orifices about 0.08 cm in diameter and a jet velocity of about 122 m/sec. For the injection, the mold may maintained at a temperature from about 40° C. to about 150° C., preferably from about 60° to about 100° C., with the mold pressure preferably in the range of about 35 to 53 N/m$^2$ (10-15 psi). A rapid exothermic reaction occurs as the polymer forms.

The activator solution is conventionally modified to slow the rate of activation of the catalyst component and thus delay the onset of the polymerization reaction. Without such moderation, the exotherm may begin about 7 to 10 seconds after mixing of the streams and polymerization may be complete in thirty seconds or less. There is a danger that polymerization might initiate prematurely and set up the polymer before monomer can be transferred from the mixer into the mold. Ethers, esters, ketones, nitriles, alkanols, sterically hindered amines and organic phosphites are conventionally used as rate moderators. Diglyme (diethylene glycol dimethyl ether), ethyl benzoate, and butyl ether are preferred, and preferably the moderators are used in a ratio of about 1.5 to 5 moles of moderator per mole of alkylaluminum compound.

The delay for the onset of polymerization can be extended to several minutes and more by selection of appropriate moderators, as is well known in the art. For example, the alkanols and the sterically hindered amines can give extended delays, sometimes even to the point where reaction will take place only with application of elevated temperatures. Such extended delay is frequently desirable where large objects, for example, weighing 450 kg (100 pounds) or more, are to be molded, and can be achieved by the addition of phenylacetylene, for instance.

Alternatively, it may desirable to have monomer incorporated in just one reactant stream or to employ a plurality of reactant streams where the additional reactant streams contain monomer or additives or both.

The catalyst component of the ring opening metathesis polymerization system (procatalyst) comprises salts of transition metals such as tungsten, molybdenum, rhenium and tantalum, the more preferred salts being the chlorides and oxychlorides. Preferred tungsten compounds may be phenoxylated tungsten chlorides of the general formulas

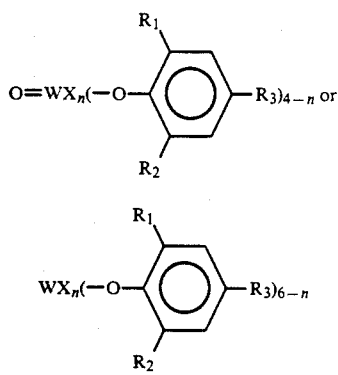

where $R_1$, $R_2$ and $R_3$ are hydrogen, or straight or branched alkyl radicals of 1 to 10 carbon atoms, and X is chlorine. Such compounds are prepared by dispersing tungsten hexachloride or tungsten oxytetrachloride in an inert solvent and treating it with the stoichiometric amount of the phenol to substitute the desired number of phenolic radicals on the tungsten. Phenoxylation of the tungsten compound solubilizes it in DCPD and also effects changes in its catalytic reactivity and efficiency while increasing its resistance to air and moisture.

The tungsten-based catalysts function as ionic polymerization catalysts for DCPD and if not stabilized, they will polymerize the DCPD on storage over several days. To increase the shelf life of the DCPD/catalyst solution, a Lewis base or a chelating agent is added to the solution to complex the phenoxylated tungsten compound and deactivate it as an ionic polymerization catalyst. Preferred Lewis bases include nitriles and ethers such as benzonitrile and tetrahydrofuran. Preferred chelants include acetylacetones and alkyl acetoacetates, where the alkyl group contains from one to ten carbon atoms. The complexing step can be carried out before or after phenylation.

The other component of the catalyst system is the activator. The preferred activators are the alkyl aluminum compounds, particularly trialkylaluminums, dialkylaluminum halides and alkylaluminum dihalides in which the alkyl groups contain one to ten carbon atoms and the halide is chloride or iodide. A particularly preferred activator combination is a mixture of trioctyl aluminum and dioctyl aluminum oxide. Other activators that can be employed conventionally include alkyl zinc compounds and alkyl tin compounds, in particular trialkyl tin hydrides.

The following examples illustrate the invention.

PREPARATION OF CATALYST CONCENTRATE

Under an inert atmosphere (glove bag), a quantity of $WCl_6$ is weighed into a glass vessel (pop bottle) containing a magnetic stirring bar. The bottle is capped and removed from the glove bag. Next, a sufficient amount of dry toluene (or other aromatic solvent) is added to generate a 0.5M slurry. With stirring, 0.25 equivalent of t-butanol (based on tungsten) is slowly added. The HCl that is generated is swept from the vessel by a slow nitrogen sparge. After at least one hour, during which time the stirring and sparging is continued, 1.2 equivalent of nonylphenol (based on tungsten) is slowly added. The mixture is again allowed to stir for at least one hour while the sparge is continued.

Finally, 2.0 equivalent of acetylacetone (2.4-pentanedione) is added, and the mixture is allowed to stir and sparge for several hours. Any solvent lost during the sparging is made up, resulting in a 0.5M solution of a stabilized metathesis catalyst in toluene.

PREPARATION OF ACTIVATOR CONCENTRATE

Under an inert atmosphere, a vessel is charged with the desired amount of tri-n-octylaluminum (TNOA). Next is charged the appropriate amount of di n-octylaluminum iodide (DOAI), to give a mixture that is 85 mole % TNOA and 15 mole % DOAI. To that is carefully added 1 equivalent (based on total aluminum) of diglyme (bis-2-methoxyethyl ether) to control the evolution of heat during the exothermic reaction. The mixture is then diluted with the appropriate amount of dicyclopentadiene (DCPD) or an inert solvent such as toluene to give a solution 1.0M in aluminum.

EXAMPLES 1 TO 6

The reactants for this experiment were prepared in 32 oz. pop-bottles designated "A" and "B". 30 gms of Neoprene W was added to bottle "A", which was then capped and sparged. After adding 600 mls of dicyclopentadiene, the bottle was put in an oil bath equipped with the magnetic stirrer. The polychloroprene was allowed to dissolve in dicyclopentadiene. A second bottle was prepared in the similar fashion. This bottle also contained 12 gms of Irganox-1035 and 12 gms of CGA 6886 antioxidants, except for Example 6, the CGA 6886 antioxidant was omitted. 21 mls of 1M activator was added to the first bottle "A". 12 mls of 0.5M catalyst was added to the second bottle "B". The respective compositions are listed in Table I as Example Mixes 1A and 1B to 6A and 6B.

Plaques measuring 10.2 cm×20.3 cm×0.32 cm (4"×8"×0.125") were made using a mini RIM machine. The liquids from bottles "A" & "B" were transferred to the respective tanks of the mini-RIM machine. After recirculating several times, liquids were injected into the heated metal mold. The A & B liquids mixed by impingement in the mixhead.

After completion of the reaction, the plaques were demolded, and used to obtain mechanical properties and residual dicyclopentadiene results, which are listed in Table I as Example Properties 1 to 6.

EXAMPLE 7

The reactants for this experiment were prepared as for Examples 1 to 6 in 32 oz. pop-bottles designated "A" and "B". 60 gms of chlorinated polypropylene, with a chlorine content of 65% (obtained from Scientific Polymer Products) was added to bottle "A", which was then capped and sparged. After adding 400 mls of dicyclopentadiene, the bottle was put in an oil bath equipped with the magnetic stirrer. The chlorinated polypropylene was allowed to dissolve in dicyclopentadiene. A second bottle was prepared in the similar fashion. This bottle also contained 16 gms of Irganox 1035 antioxidant. 14 mls of 1M activator was added to the first bottle "A",and 8 mls of 0.5M catalyst was added to the second bottle "B". The respective compositions are listed in Table I as Example Mixes 7A to 7B (following the column headed "Ex. Mix").

Plaques measuring 10.2 cm×20.3 cm×0.32 cm (4"×8"×0.125") were made using a mini RIM machine. The liquids from bottles "A" & "B" were transferred to the respective tanks of the mini-RIM machine. After recirculating several times, the liquids were injected into the heated metal mold. The A & B liquids mixed by impingement in the mixhead.

After completion of the reaction, the plaques were demolded, and used to measure mechanical properties and residual dicyclopentadiene results, which are listed in Table I as Example properties (following the column headed "Ex. Prop") 1 to 7.

EXAMPLE 8

This Example demonstrates the increase in $T_g$ that results from the process according to the invention. 4 gms of Neoprene W was added to a 8 oz. bottle. After chine. The liquids from bottles "A" & "B" were transferred to the respective tanks of the mini-RIM machine. After recirculating several times, liquids were injected into the heated metal mold. The A & B liquids mixed by impingement in the mixhead.

After completion of the reaction, the plaques made from Examples 1 to 7 were demolded and used to obtain mechanical properties and residual dicyclopentadiene results, which are listed in Table I as Example properties (following the column "Ex. Prop") 1 to 7. The plaque made from the Control Experiment was demolded and had the following properties: residual dicyclopentadiene, 2.5%; HDT, 85° C.; impact strength, 4.3 J/cm; $T_g$ 127°.

TABLE I

| Ex. Mix | DCPD ml | PCP[1] ml | CPP[2] g | ENBN[3] g | CDPM[4] ml | DCDPM[5] ml | 2C2B[6] ml | Ex. Prop | Res. % DCDP | HDT °C. | Impact J/cm |
|---|---|---|---|---|---|---|---|---|---|---|---|
| 1A | 600 | 30 | — | — | — | — | — | 1 | 0.78 | 97 | 5.1 |
| 1B | 600 | 30 | — | — | — | — | — | | | | |
| 2A | 600 | 30 | — | — | — | — | — | 2 | 0.78 | 105 | 6.0 |
| 2B | 600 | 30 | — | — | 1 | — | — | | | | |
| 3A | 600 | 30 | — | — | — | — | — | 3 | 0.68 | 103 | 6.1 |
| 3B | 600 | 30 | — | — | — | 1.1 | 1 | | | | |
| 4A | 600 | 30 | — | — | — | — | — | 4 | 0.81 | 99 | 6.7 |
| 4B | 600 | 30 | — | — | 1 | — | 1 | | | | |
| 5A | 600 | 30 | — | — | — | — | — | 5 | 1.33 | 103 | 8.6 |
| 5B | 600 | 30 | — | — | 1 | 1.1 | — | | | | |
| 6A | 600 | 30 | — | — | — | — | — | 6 | 1.29 | 110 | 8.0 |
| 6B* | 600 | 30 | — | — | 1 | 1.1 | 1 | | | | |
| 7A | 400 | — | 60 | 8 | — | — | — | 7 | 0.9 | 102 | 0.1 |
| 7B | 400 | — | 60 | 8 | 0.87 | — | — | | | | |
| CA# | 600 | — | — | — | — | — | — | Ctrl | 2.5 | 85 | 4.3 |
| CB# | 600 | — | — | — | — | — | — | | | | |

[1] Polychloroprene (Neoprene W)
[2] Chlorinated Polypropylene (65% chlorine)
[3] Ethylidene norbornene
[4] Chlorodiphenyl methane
[5] Dichlorodiphenyl methane
[6] 2 Chloro-2-butene
*CGA 6886 antioxidant omitted
36 g SBR in each bottle for Control capping and sparging with nitrogen, 100 mls of dicyclopentadiene was added and the elastomer was dissolved using a magnetic stirrer. 20 mls of this solution was transformed to a capped and sparged polymerization tube. To this tube, 0.24 mls of 1M activator and 0.16 mls of 0.5M catalyst was added. After mixing, the mixture was allowed to polymerize. Then the plug of polymer formed was taken out by breaking the polymerization tube, and was machined to give a $2\frac{1}{2}"\times\frac{1}{2}"\times\frac{1}{8}"$ bar. Using this bar, the $T_g$ was determined by Dynamic Mechanical Analysis, which was found to be 152° C. This represents an increase of about 25° C. over the control without polychloroprene. The residual dicyclopentadiene, determined by extraction in toluene and GC analysis, was 0.79%.

CONTROL EXPERIMENT

The reactants for this experiment were prepared as for Examples 1 to 6 in 32 oz. pop bottles designated "A" and "B". 36 gms of the hydrocarbon elastomer SBR was added to bottle "A", which was then capped and sparged. After adding 600 mls of dicyclopentadiene, the bottle was put in an oil bath equipped with a magnetic stirrer. The SBR was allowed to dissolve in dicyclopentadiene. A second bottle was prepared in the similar fashion. This bottle also contained 16 gms of Irganox-1035 antioxidant. 14 mls of 1M activator was added to the first bottle "A", and 8 mls of 0.5M catalyst was added to the second bottle "B".

Plaques measuring 10.2 cm×20.3 cm×0.32 cm (4"×8"×0.125") were made using a mini-RIM ma-

I claim:

1. A crosslinked thermostat structural polymer composition obtained by the metathesis polymerization and simultaneous crosslinking of a dicyclopentadiene monomer in which is dissolved 3 to 10% by weight of a chlorinated polymer.

2. The crosslinked thermoset polymer composition of claim 1 in which the dicyclopentadiene monomer is dicyclopentadiene.

3. The crosslinked thermoset polymer composition of claim 1 in which the dicyclopentadiene monomer is a mixture of dicyclopentadiene and another norbornene group-containing cycloolefin.

4. The crosslinked thermoset polymer composition of claim 1, 2, or 3, in which the chlorinated polymer is an elastomer.

5. The crosslinked thermoset polymer composition of claim 4, which contains 3 to 10% by weight of the chlorinated polymer.

6. The crosslinked thermoset polymer composition of claim 5, which contains 5 to 8% by weight of the chlorinated polymer.

7. The crosslinked thermoset polymer composition of claim 4, in which the elastomer is polychloroprene.

8. The crosslinked thermoset polymer composition of claim 1, 2, or 3, in which the chlorinated polymer is chlorinated polypropylene.

9. The crosslinked thermoset polymer composition of claim 8, which contains 3 to 20% by weight of the chlorinated polypropylene.

10. The crosslinked thermoset polymer composition of claim 9, which contains 10 to 15% by weight of the chlorinated polypropylene.

11. The crosslinked thermoset polymer composition of claim 8, in which the chlorinated polypropylene contains 65% chlorine.

12. A dicyclopentadiene polymer composition comprising a ring-opened crosslinked thermoset dicyclopentadiene polymer and a dicyclopentadiene-soluble chlorinated polymer.

13. The polymer composition of claim 12 in which the dicyclopentadiene polymer is poly(dicyclopentadiene).

14. A method for preparing a polymer composition comprising adding a chlorinated polymer to at least one of two reactant liquid streams, one of which contains dicyclopentadiene and a ring-opening metathesis catalyst and the other contains a catalyst activator, combining the two streams, and charging them to a mold or similar forming container in which the dicyclopentadiene polymerizes into a crosslinked thermoset structural polymer which incorporates units of the dissolved chlorinated polymer.

15. The method for preparing the polymer composition of claim 14 in which one of the reactant streams contains a norbornene group-containing cycloolefin other than dicyclopentadiene.

* * * * *